L. E. WILLARD.
CONTROLLING MECHANISM.
APPLICATION FILED NOV. 6, 1916.
1,392,378.
Patented Oct. 4, 1921.
2 SHEETS—SHEET 1.
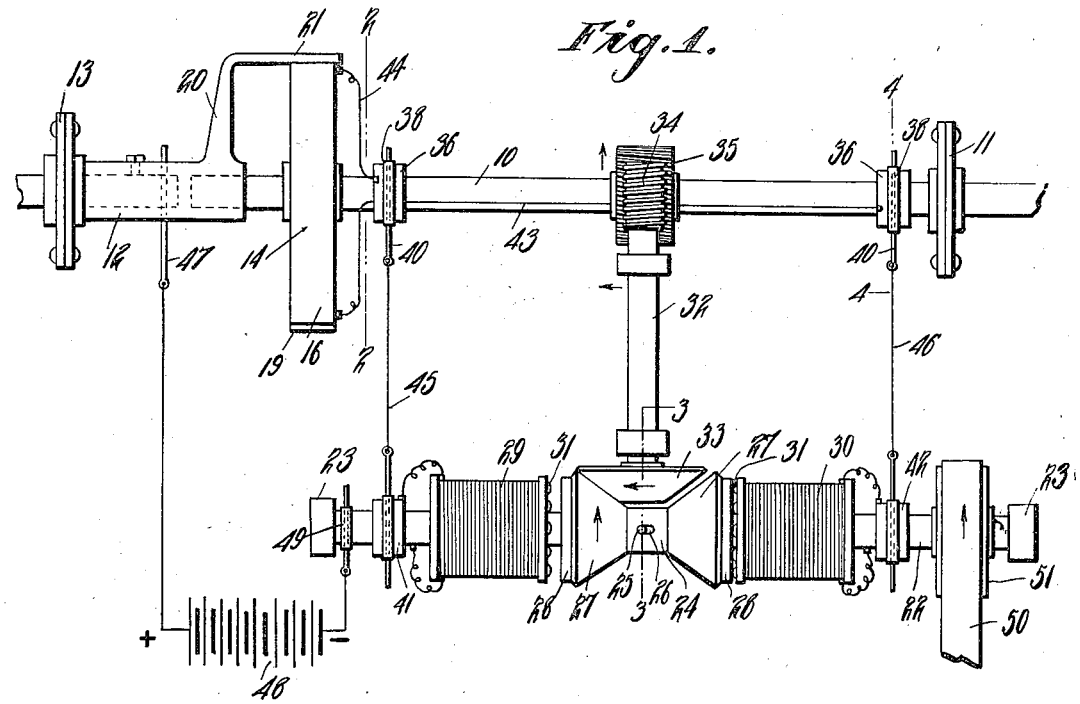
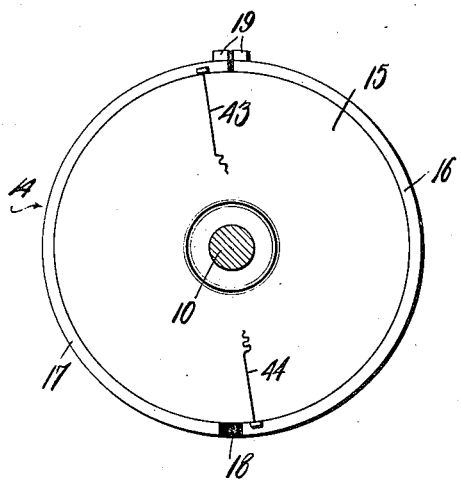
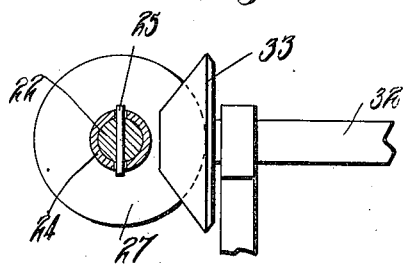
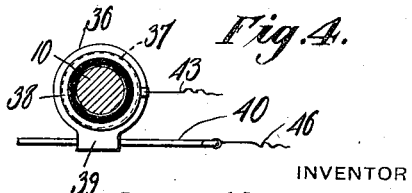
WITNESSES
W. C. Fielding
Wm. Feamin
INVENTOR
Louie E. Willard
BY Richard B. Owen.
ATTORNEY

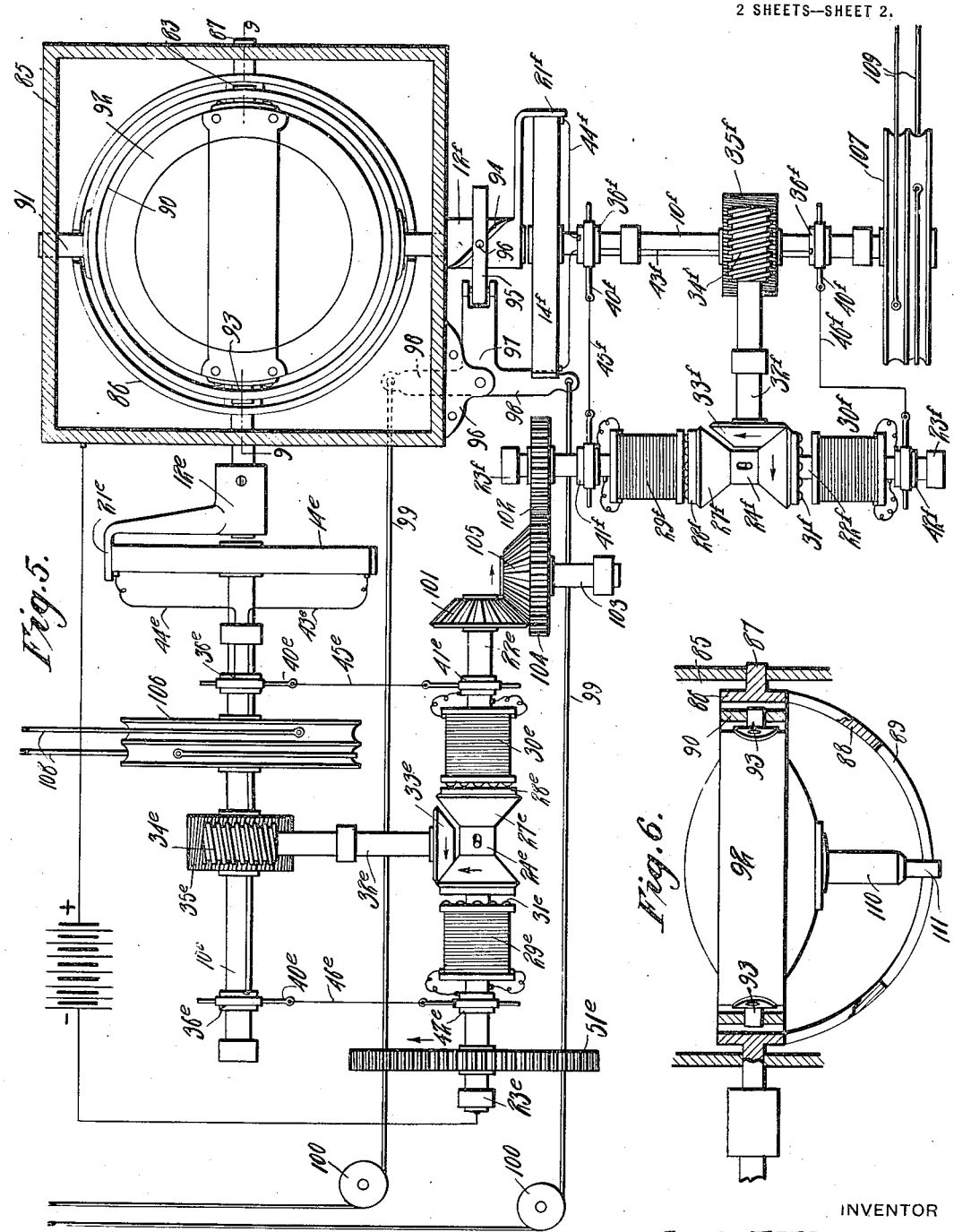

UNITED STATES PATENT OFFICE.

LOUIE E. WILLARD, OF CHULA, ARKANSAS.

CONTROLLING MECHANISM.

1,392,378.

Specification of Letters Patent.

Patented Oct. 4, 1921.

Application filed November 6, 1916. Serial No. 129,832.

*To all whom it may concern:*

Be it known that I, LOUIE E. WILLARD, a citizen of the United States, residing at Chula, in the county of Yell and State of Arkansas, have invented certain new and useful Improvements in Controlling Mechanisms, of which the following is a specification.

This invention has relation to controlling mechanisms for various kinds of machinery, and has for an object to provide means for utilizing power from a prime mover or other motive power used for driving the particular machine to be controlled, to perform the controlling operations, the application of said power being controlled by manually operable means.

Another object of the invention is to provide a power operated controlling means having the above named characteristics, and in which the application of power may be controlled automatically through the agency of a gyroscope, whereby the mechanism of my invention may be utilized to control the stabilizing apparatus of an aeroplane, or under-water craft.

In addition to the foregoing my invention comprehends improvements in the details of construction and arrangement of parts to be hereinafter more fully described, and particularly set forth in the appended claims.

In the accompanying drawings in which similar and corresponding parts are designated by the same characters of reference throughout the several views in which they appear:

Figure 1, is a diagrammatic view of the essential parts of my invention, illustrating the principle upon which it is based.

Fig. 2, is a cross sectional view taken on the line 2—2 of the preceding figure.

Fig. 3, is a detail sectional view taken on the line 3—3 of Fig. 1.

Fig. 4, is a similar view taken on the line 4—4 thereof.

Fig. 5, is a diagrammatic view illustrating the embodiment of a gyroscope in controlling mechanisms constructed after my invention, whereby the stability of an aeroplane or the like may be controlled.

Fig. 6, is a cross sectional view taken on the line 9—9 of the preceding figure, and With reference to the drawings, 10 indicates the controlling shaft of my invention, provided at one end with a coupling 11 whereby the rotative movement of the shaft may be imparted to any mechanism for controlling the movement of a vehicle, aeroplane, etc., the opposite end of the shaft being loosely mounted in a sleeve 12 which may be connected through the medium of a coupling 13 to any means, operable manually or automatically, for rotating the sleeve whereby the control of the mechanisms takes place in a manner which will presently appear. The shaft 10 is also provided with a controlling commutator 14 in the nature of a disk 15 having disposed upon its periphery, semi-circular contact members 16, and 17, the terminals thereof being insulated from each other by placing therebetween a segment of insulating material, one of which is designated 18. The opposite terminals of the semi-circular contact members may be formed with spaced stops 19, to limit the movement of the contact arm which is adapted for engagement with the said plates. The sleeve 12 is provided with a laterally extending arm 20 having its terminal bent at substantially right angles and formed into a contact finger or brush 21, which frictionally engages the contact plates 16 or 17 during rotation of the commutator, but is normally disposed in engagement with the insulated portion thereof 18.

A power shaft 22 is disposed parallel to the shaft 10, and is journaled for rotation adjacent its opposite ends in bearings 23. Intermediate the shaft 22, there is provided an encircling sleeve 24 connected for rotation to the shaft through the agency of a transversely extending pin 25 which is rigidly fixed in the shaft 22, but extends through longitudinally extending elongated openings 26 in the sleeve. In this manner, the sleeve is mounted for rotation with the shaft and also for slight longitudinal reciprocation. The sleeve is formed at opposite ends with friction bevel gears 27, to the outer faces of which annular soft iron armatures 28 are secured. It is to be noted at this point, that while I specified that the gears 27 were of the friction type, nevertheless toothed gearings may also be employed without departing from the spirit of the invention. Electro-magnets 29 and 30, are provided upon the power shaft 22 at opposite sides of the central gearing, said magnets having central longitudinal openings through which the said shaft passes, the magnets being secured to the shaft for rotation therewith. The magnets are further provided with multiple pole pieces 31 disposed in proximity to the armatures 28 of the reversing gears 27, whereby when either of the magnets is energized the gearing will be attracted thereto, in an obvious manner. A counter-shaft 32 extends at right angles to the shafts 10 and 22 and therebetween, one end of said shaft having a friction bevel gear 33 which is disposed between the reversing gears 27, and is adapted for engagement with either one of said reversing gears. The opposite end of the counter-shaft is provided with a spiral gear 34 which is in engagement with a similar gear 35 fixedly secured for rotation therewith and upon the controlling shaft 10.

The controlling shaft is provided adjacent its opposite end with distributing commutators in the nature of collars 36 having formed therein, annular grooves 37, the collars being fixedly secured to the shaft for rotation therewith. A contact member 38 is provided in the nature of a ring adapted for engagement within the groove 37 and having a lateral apertured enlargement 39 in which a binding post 40 is inserted. The power shaft 22 is similarly provided with receiving commutators which are duplicates in construction of the commutators 36, a receiving commutator 41 being provided upon the shaft adjacent the electro-magnet 29, a similar receiving commutator 42 being provided for and adjacent the electro-magnet 30. The segmental contact plate 16 of the controlling commutator 14, may be placed in communication with the right hand distributing commutator 36 of the shaft 10 through the agency of a conductor 44, the said metal contact plate 17 being similarly placed in communication with the left hand distributing commutator 36 through the agency of a conductor 43. The left hand distributing commutator 36 may be electrically circuited with the receiving commutator 41 of the power shaft by means of its conductor 45, while the right hand distributing commutator 36 is similarly connected to the receiving commutator 42 by means of a conductor 46. The circuit is now completed through the agency of a contact finger 47 adapted for frictional engagement with the controlling sleeve 12, which finger is in series with a source of current 48, said source of current being also connected by means of a commutator arrangement 49 upon the power shaft, thereby constituting the return. The terminals of the electro-magnets 29 and 30 are furthermore electrically connected to their respective commutators 41 and 42, and to the power shaft 22 upon which they are mounted.

In operation, and assuming that the sleeve 12 is adapted to be rotated, either manually or automatically through the provision of gyroscope or other controlling means, when the sleeve is rotated in a clockwise direction, for instance, in order to impart movement to controlling mechanisms operatively connected to the shaft 10, the contact brush 21 will be slightly rotated so as to remove the same from the insulated portion 18 of the commutator, and into electrical engagement with the segment 16. In this manner, the electro-magnet 30 will become energized owing to the completion of a circuit therethrough which includes the source of current. The current traverses a path including the positive pole of the battery 48, finger 47, the arm 20 and finger 21, the commutator 16, conductor 43, contact finger 40, the conductor 46, to the commutator 42, electro-magnet 30, returning through the shaft 22 which is connected to the magnet through the negative pole of the battery. The electromagnet 30 having thus been energized the connected reversing gears 27 will be moved longitudinally upon the power shaft 22 to the position indicated in Fig. 1, whereupon the gear 33 will be engaged by the left-hand reversing gear 27. The power shaft 22 is adapted to be continually rotated through the medium of a belt or other means 50, operating over a pulley or the like 51, and as a consequence the counter-shaft 32 is rotated, its motion being communicated through the medium of the gears 34 and 35 to the shaft 10, which in turn, actuates the controlling mechanism of the vehicle, etc. Owing to the fact that the controlling commutator 14 is fixedly secured upon the shaft 10, it is likewise rotated until its insulated portion 18 is again brought into engagement with the brush 21 of the controlling sleeve, whereupon the electric circuit including the electro-magnet 30 is disestablished with the result that the gears 27 and 33 are no longer held in engagement whereupon rotative motion of the shaft 10 ceases as a consequence. While the various steps whereby the rotation of the sleeve 12 effects the corresponding rotation of the sleeve 10 are thus separately described, nevertheless in actual practice the movement of the shaft 10 responds so quickly to the movement of the sleeve 12 and arm 20 as to constitute in effect a single movement, and the commutator therefore follows the movement of the brush 21.

Thus, the actual force applied upon the controlling sleeve 12 to rotate the same is merely nominal, while the actual power applied to the controlling shaft 10 may be as great as desired. In this manner, an easily operated manually controlled means is thus enabled to cause the application upon controlling mechanism of a considerable amount of power, which it would not be possible to obtain manually.

When the sleeve 12 is rotated in a counter direction to bring the same back to original position, the brush 21 will be moved to electrical engagement with the segment 17 of the commutator 14 whereupon the left-hand electro-magnet 29 is energized with a current coming from the positive pole of the battery 48 through the finger 47, the arm 20 and finger 21 to the commutator 16, through the conductor 44 to the commutator 36 connected thereto, through the conductor 45 to the shaft 22 returning through said shaft to the negative pole of the battery with the result that the reversing gears are moved in an opposite direction so as to cause engagement between the right hand reversing gear 27 and the gear 33. A rotation of the counter shaft 32 in a reverse direction is thus provided with a corresponding reverse rotation of the controlling shaft 10 to thus actuate the controlling mechanism of the vehicle, etc., to restore the same to normal condition. A complete rotation of the brush 21 relative to the commutator is prevented owing to the provision of the stop 19, with which the brush engages upon such extreme movement.

In Figs. 5 and 6, inclusive, I have illustrated a different embodiment of my invention, and in this instance, for the sake of convenience, the parts of the mechanism illustrated in said figures will be designated with reference characters which are similar to the characters employed in connection with the apparatus described above, said reference characters being placed on corresponding parts and only qualified where used upon the five different sets of apparatus by the use of qualifying exponents $a$, $b$, etc.

In Figs. 5 and 6, of the drawings, I have illustrated an automatically operable mechanism for controlling the stabilizing apparatus of an aeroplane, through the medium of a gyroscope. With reference to these figures, an arrangement is illustrated wherein the controlling shafts $10^e$ and $10^f$ are disposed at right angles with the prolongation of their axes in intersecting planes. The adjacent ends of said shafts are furthermore extended into a casing 85 which is adapted to contain the gyroscope mechanism which for the purposes of my invention includes an outer ring 86 disposed in a normally horizontal plane and whose diametrical center forms the prolongation of the axis of the controlling shaft $10^e$. The terminal of the controlling shaft $10^e$ which extends into the gyroscope casing is rigidly fixed to said ring, and the diametrically opposite point of the ring is provided with a trunnion 87 for oscillatably supporting the same. Said ring 86 is furthermore provided with a downwardly extending arcuate guiding member 88, the curvature of which is formed by a radius extending from the center of the ring 86. The guiding member 88 is furthermore provided with a longitudinally extending guiding slot 89 for a purpose which will be presently obvious. A second ring 90 is provided concentrically within the ring 86 and adapted to be disposed in the same horizontal plane and with oppositely extending trunnions 91 mounted in the side walls of the gyroscope housing. The trunnions 91 are in alinement, and along a plane at exactly right angles to the shaft $10^e$ and its trunnion 87. One of the aforesaid trunnions 91 is extended exteriorly of the gyroscope housing for connection to the sleeve $12^f$ of the mechanism for controlling one of the stabilizing elements of the aeroplane. The inner ring 90 is furthermore adapted to pivotally support a gyroscope which is contained within a casing 92. The casing of the gyroscope has been illustrated only as the interior construction thereof is well known, and it is deemed unnecessary to enter into a description thereof. It suffices to say, however, that a heavy wheel is mounted therein for rotation about a vertical axis. The gyroscope casing is furthermore supported upon oppositely extending trunnions 93 which are journaled in the ring 90, said trunnions 93 lying in a plane which coincides exactly with the axial center of the controlling shaft $10^e$ and its corresponding trunnion 87.

The sleeve $12^f$ is formed with a spiral groove 94, and an annular member 95 is encircled about the sleeve and provided with an inwardly extending diametrically disposed pin 96 adapted to engage in the aforesaid spiral groove. The adjacent trunnion 91 has an elongated slot 91' into which said pin 96 also extends. A bracket 96' is secured to one side of the gyroscopic housing 85 for supporting a substantially T-shaped member 97 pivoted at the intersection of its arms to the bracket, the oppositely extending arms 98 thereof being connected to flexible elements 99 which pass about pulleys 100 and are led to a suitable manually controlling mechanism. (Not shown).

The power shafts $22^e$ and $22^f$ are in the present instance, disposed at relatively right angles, the power shaft $22^e$ being provided upon one of its adjacent terminals with a bevel gear 101 the power shaft $22^f$ having upon its adjacent terminal a spur gear 102. An idler shaft 103 is located between the terminals of the shafts $22^e$ and $22^f$ and is disposed parallel to the shaft $22^f$ and provided with a spur gear 104 adapted for meshing engagement with the aforesaid gear 102. The shaft 103 also carries a bevel gear 105 adapted for meshing engagement with the aforesaid bevel gear 101. Thus, the rotation of the power shaft $22^e$ may be imparted to the shaft $22^f$ through the medium of the aforedescribed gearing, the shaft $22^e$ receiving its power through the medium of its gear 51ᵉ. The controlling shafts 10ᵉ and 10ᶠ are each provided with a double pulley designated 106 and 107 respectively, with cables 108 and 109 passing around said pulleys and toward the ailerons and horizontal rudder of the aeroplane to actuate the same. It is preferable that the controlling shaft 10ᶠ and its pulleys and cables 107 and 109 be employed to operate the horizontal rudder, as owing to the provision of the T-shaped member 97 and its correlated parts, the controlling sleeve 12ᶠ may be rotated manually as well as automatically. To this end, the cables 99 are led to the controlling wheel of the aeroplane.

The gyroscope casing 92 is provided with a depending stud 110 having a reduced extremity 111 which is adapted to enter the longitudinal opening 89 of the guide member 88 which forms a part of the ring 86. The gyroscope casing is thus mounted for universal movement, and as the axes of this movement are located along lines coincident with the longitudinal axes of the controlling shaft 10ᵉ and 10ᶠ, when the gyroscope casing is oscillated in one direction or the other in an effort to retain itself in its original plane of rotation, either the ring 86 or 90 will be likewise oscillated, and as these rings are each connected to the sleeve 12ᵉ or 12ᶠ, said sleeves will be likewise rotated with the result that the brush member 21ᵉ or 21ᶠ as the case may be will be moved relatively to their commutators. Such a movement will have the effect to produce a corresponding movement of either the controlling shaft 10ᵉ or 10ᶠ in the manner set forth in connection with the description of the first form of my invention, and the pulleys 106 and 107 will be rotated thereby drawing upon their cables, and actuating the ailerons or horizontal rudder. From the illustration it will be obvious that if the ring 86 is oscillated the sleeve 12ᵉ connected thereto will be likewise rotated, and conversely if the ring 90 is oscillated a corresponding movement will be produced upon the sleeve 12ᶠ. If the ring 90 is oscillated, it will be through a movement of the gyroscope casing 92 in a plane coincident with the plane of the shaft 10ᵉ, the stud 111 moving freely in the opening 89 of the guide member 80. On the other hand, should the gyroscope casing 92 be oscillated in a direction at right angles to this, owing to the engagement of the stud 111 in the guide member 88, said guide member will be oscillated and likewise the ring of which it forms a part with the result that the sleeve 12ᵉ is rotated with the consequences mentioned above.

Thus, if this apparatus is located upon an aeroplane, and the gyroscope initially adjusted with reference to the true horizontal plane, as the aeroplane travels, any tilting thereof in a forward or lateral direction will be automatically compensated for and the aeroplane brought back again to a level position owing to the fact that the rings 86 and 90 will be moved relatively by the gyroscope, which gyroscope having once been adjusted with reference to the true horizontal plane, will retain its original adjustment. In order that the horizontal rudder may be manually controlled, the T-shaped member and cables therefor mentioned above are provided, and by drawing upon either of the cables 99 the T-shaped member 97 will be oscillated in one direction or the other thereby producing a reciprocatory movement of the annular member 95, which as before stated is provided with pins which engage in spiral grooves in the sleeve 12ᶠ, and as the result thereof said sleeve is given a rotary movement. The elevators may therefore be controlled independently of the automatic controlling means therefor, it being understood that this independent control is to be used in the event of the gyroscope stopping so that a breakdown of the gyroscope will not put it beyond the pilot's power to control the machine.

While I have illustrated and described my invention with some degree of particularity, I realize that in practice various alterations thereover may be made, and I therefore reserve the right and privilege of changing the form of the details of construction, or otherwise altering the arrangement of the correlated parts without departing from the spirit of the invention, or the scope of the appended claims.

Having thus described my invention, what I claim as new and desire to secure by Letters Patent is:—

1. In a controlling mechanism, a gyroscope mounted for movement in two planes, a pair of controlling shafts having their axes disposed at relative right angles, a commutator carried by each controlling shaft, a pair of arms mounted for rotation and for engagement with each of the commutators, each arm being rotatable about an axis coincident with the axis of rotation of the correlated controlling shaft, means operatively connecting the gyroscope to the arms whereby movement of the gyroscope in one direction will rotate one arm and a movement of the gyroscope in another direction will operate the other arm, and means for driving the shaft, a reversing gear associated with each shaft, and electrically operable means controllable by movement of the arms and commutators to operate the reversing mechanism.

2. In a controlling mechanism, a gyroscope mounted for movement in two planes, a pair of controlling shafts mounted to dispose the axes thereof at relative right angles, a commutator carried by each controlling shaft, an arm movable adjacent each commutator for contact therewith each arm having an operative connection to the gyroscope, whereby a movement of the gyroscope in one plane will move one arm, and a movement of the gyroscope in another plane will move the other arm, a spirally grooved boss formed on one arm, a ring encircling said boss, a pin on said ring extending into the groove of the boss, means for reciprocating said ring to oscillate the arm, means for driving the shaft, a reversing gear associated with each shaft, and electrically operable means controllable by movement of the arms to operate one or the other of the reversing mechanisms, one of said shafts being operable through movement of the ring in the manner described.

3. A gyroscope controlling mechanism including a gyroscope mounted for movement in two planes, a pair of spindles having their axes disposed at relative right angles, means operable by movement of the gyroscope in one plane to rotate one spindle, means operable by movement of the gyroscope in another plane to rotate the other spindle, a controlling shaft in alinement with each spindle, a driving means for the controlling shaft, a combined electrically operable clutch and reversing mechanism associated with each controlling shaft and interposed between said controlling shaft and said driving mechanism, and means operable by movement of the spindle for operating the associated clutch and reversing mechanism whereby to produce a movement of the controlling shaft in a direction corresponding to and in proportion to the direction and extent of movement of the associated spindle.

4. A gyroscope controlling mechanism including a gyroscope, a first control member, a second control member, said control members being mounted at an angle from each other, means to drive the control members, means operable through movement of the gyroscope to vary the direction of movement of the first and second control members, and means manually operable to vary the direction of movement of one of said control members relatively to the other control member for the purpose specified.

In testimony whereof I affix my signature in presence of two witnesses.

LOUIE E. WILLARD.

Witnesses:
JOHN L. MAY,
SAMUEL M. SMALLWOOD.